United States Patent [19]
Yamagata

[11] Patent Number: 6,061,090
[45] Date of Patent: May 9, 2000

[54] RECORDING AND/OR REPRODUCING APPARATUS

[75] Inventor: Shigeo Yamagata, Kawasaki, Japan

[73] Assignee: Canon Kabushiki Kaisha, Tokyo, Japan

[21] Appl. No.: 08/364,519

[22] Filed: Dec. 27, 1994

Related U.S. Application Data

[63] Continuation of application No. 08/240,086, May 19, 1994, abandoned, which is a continuation of application No. 08/118,478, Sep. 8, 1993, abandoned, which is a continuation of application No. 07/849,803, Mar. 11, 1992, abandoned, which is a continuation of application No. 07/598,771, Oct. 19, 1990, abandoned, which is a continuation of application No. 07/432,336, Nov. 6, 1989, abandoned, which is a continuation of application No. 06/923,324, Oct. 27, 1986, abandoned.

[30] Foreign Application Priority Data

Oct. 30, 1985 [JP] Japan ................. 60-245237
Oct. 30, 1985 [JP] Japan ................. 60-245238

[51] Int. Cl.$^7$ .............................. H04N 1/10; G11B 33/10
[52] U.S. Cl. ......................... 348/220; 360/137; 386/120
[58] Field of Search ........................... 360/75, 78, 78.04; 369/32, 43, 44, 54, 58; 358/906, 909, 909.1; 348/220

[56] References Cited

U.S. PATENT DOCUMENTS

| | | | |
|---|---|---|---|
| 4,200,893 | 4/1980 | Matison | 360/72.1 |
| 4,224,644 | 9/1980 | Lewis et al. | 360/72.2 |
| 4,325,134 | 4/1982 | Langley et al. | 369/58 |
| 4,456,931 | 6/1984 | Toyoda et al. | 358/906 |
| 4,689,787 | 8/1987 | Miura et al. | 360/78 |
| 4,691,252 | 9/1987 | Okada et al. | 358/909 |
| 4,698,702 | 10/1987 | Miyake | 360/78 |
| 5,053,898 | 10/1991 | Hashimoto et al. | 360/75 |

FOREIGN PATENT DOCUMENTS

| | | | |
|---|---|---|---|
| 58-1809 | 1/1973 | Japan . | |
| 53-131818 | 11/1978 | Japan . | |
| 54-140507 | 10/1979 | Japan . | |
| 55-113137 | 9/1980 | Japan | 369/58 |
| 56-25236 | 3/1981 | Japan | 369/32 |
| 56-25238 | 3/1981 | Japan | 369/32 |
| 57-14260 | 1/1982 | Japan . | |
| 57-64342 | 4/1982 | Japan . | |
| 57-167142 | 10/1982 | Japan . | |
| 57-186268 | 11/1982 | Japan | 360/97 |
| 57-212660 | 12/1982 | Japan | 360/86 |
| 58-1809 | 1/1983 | Japan | 360/78 |
| 58-83312 | 5/1983 | Japan | 360/78 |
| 58-114353 | 7/1983 | Japan . | |
| 58-158082 | 9/1983 | Japan . | |
| 59-71102 | 4/1984 | Japan . | |
| 59-178603 | 10/1984 | Japan . | |
| 62-24435 | 2/1987 | Japan . | |

OTHER PUBLICATIONS

IBM TDB, vol. 19, No. 10 "Disk File Test Equipment" Blythin, Mar. 1977, pp. 3901–3902.

*Primary Examiner*—David Robertson
*Attorney, Agent, or Firm*—Robin, Blecker & Daley

[57] ABSTRACT

A reproducing apparatus for detecting and storing information about the presence or absence of information in each recording track of a recording medium. A scanning head is first moved to the recording track which is in a position opposite the the recording track in which the reproduction will be initiated. Then the scanning head successively processes each recording track to determine the presence or absence of information. Upon termination of the processing of each recording track, the scanning head is located at the recording track in which the reproduction will be initiated. Display is made of the number of consecutive blank tracks.

10 Claims, 8 Drawing Sheets

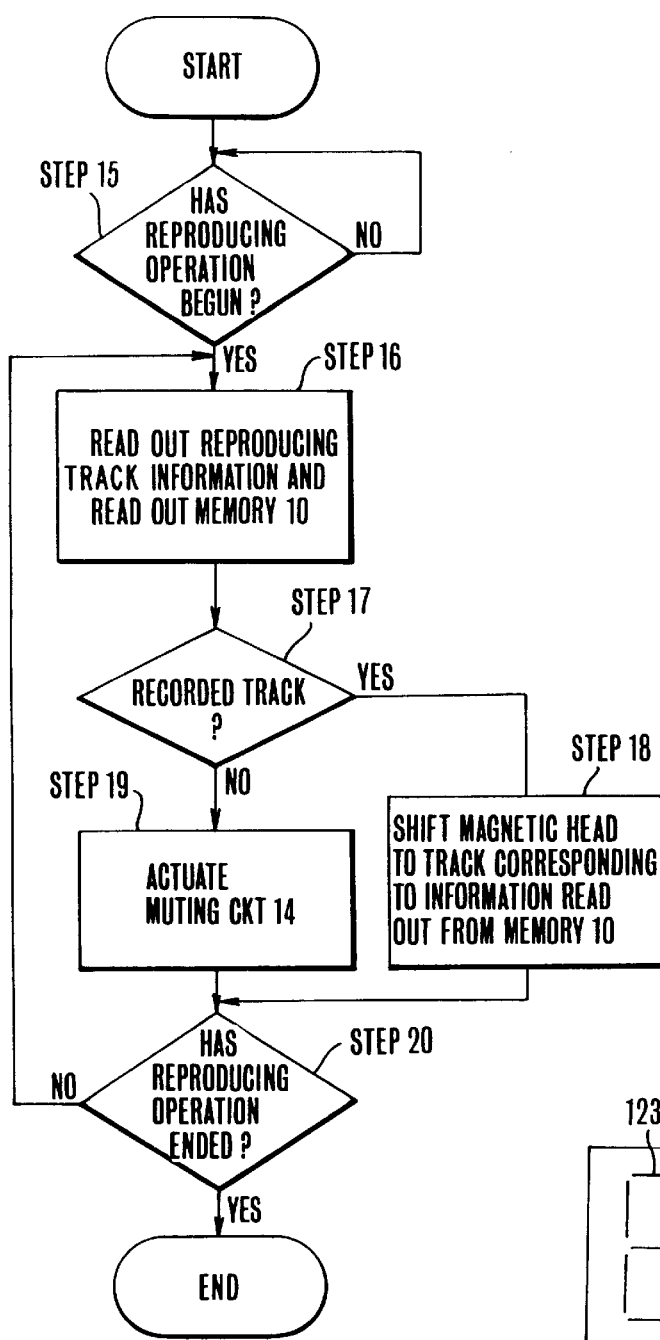
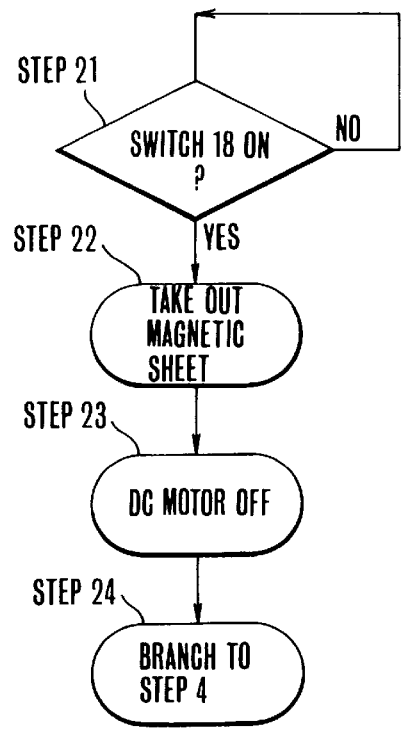
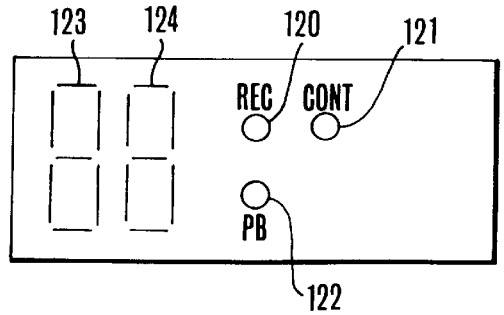

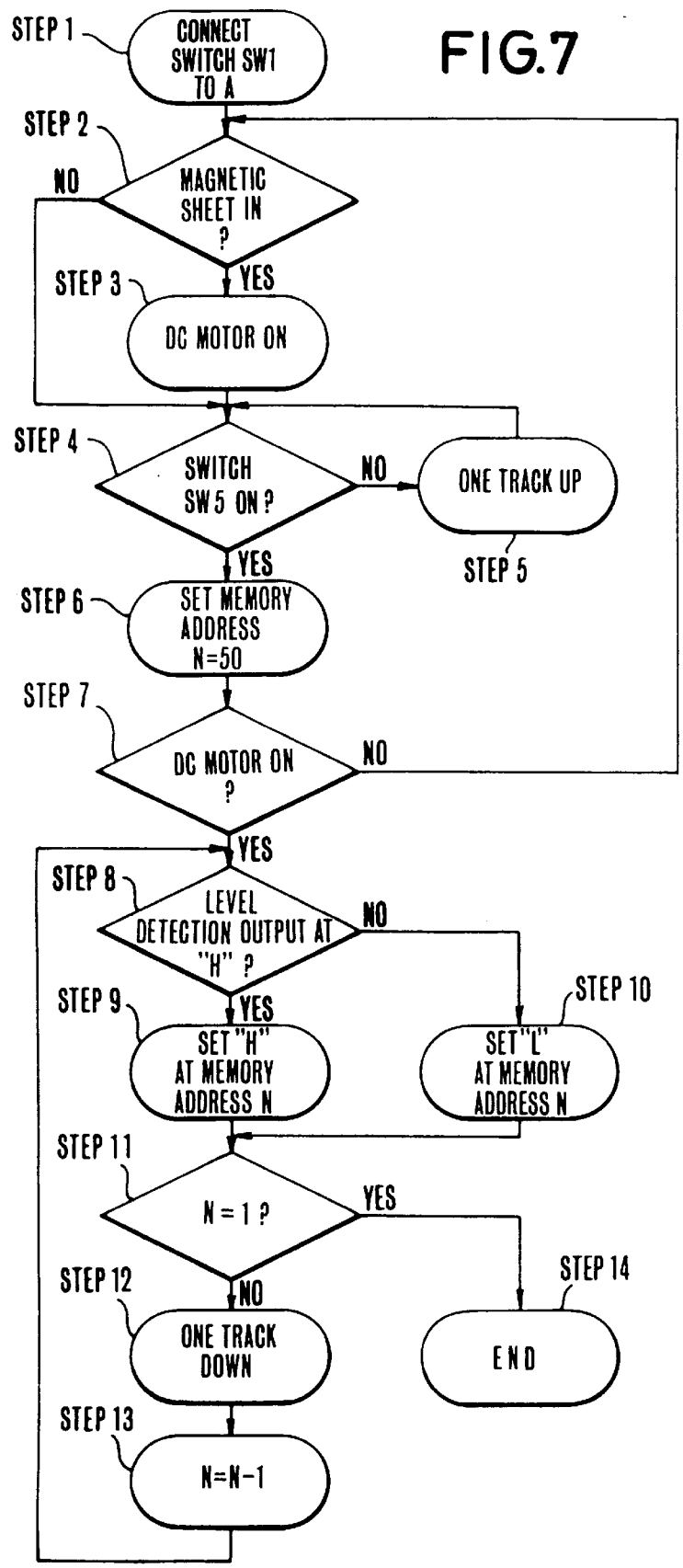

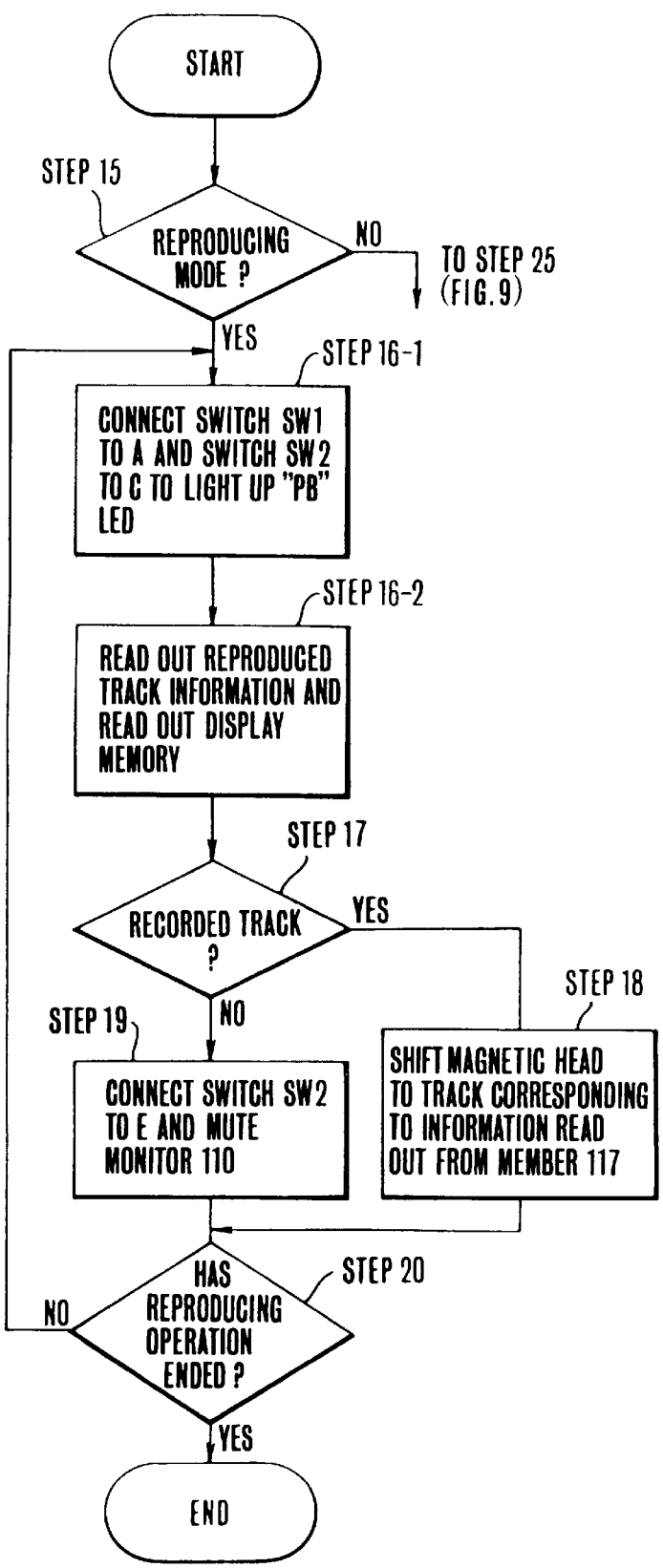

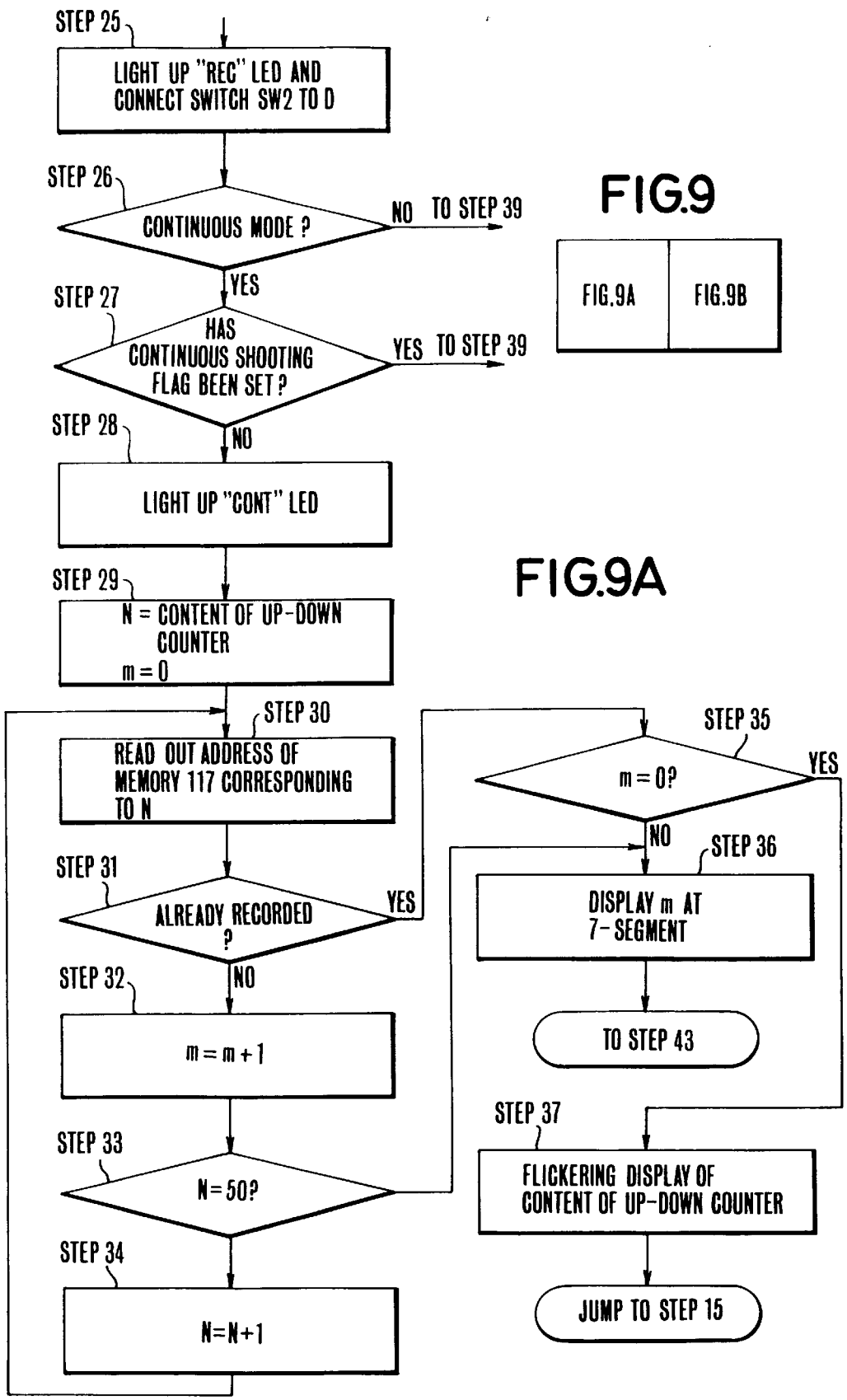

RECORDING AND/OR REPRODUCING APPARATUS

This application is a continuation of Ser. No. 08/240,086, filed May 9, 1994 (now abandoned), which is a continuation of Ser. No. 08/118,478, filed Sep. 8, 1993 (now abandoned), which is a continuation of Ser. No. 07/849,803, filed Mar. 11, 1992 (now abandoned), which is a continuation of Ser. No. 07/598,771, filed Oct. 19, 1990 (now abandoned), which is a continuation of Ser. No. 07/432,336, filed Nov. 6, 1989 (now abandoned), which is a continuation of Ser. No. 06/923,324, filed Oct. 27, 1986 (now abandoned).

BACKGROUND OF THE INVENTION

1. Field of the Invention

This invention relates to the various functions of a recording and/or reproducing apparatus.

2. Description of the Related Art

Heretofore, random accessible reproducing apparatuses of varied kinds using a record bearing medium such as a magnetic disc have been developed. In most cases, these apparatuses are arranged to handle different records of information recorded in recording tracks, each independently of another. Hence, the information recorded in some of these tracks is often discretely erased as desired.

Practice has been to detect the presence or absence of a previous record in a next track every time a recording operation or a reproducing operation is completed in or from one track; and then to allow the operation to jump to a next unrecorded or vacant track in the case of recording or to a next recorded track in the case of reproduction. Therefore, in the event that a large number of tracks are to be skipped over, an excessively long access time becomes necessary. If the next usable track happens to be the last of all the tracks or in the event of no usable track, a long period of time is wasted by meaningless detecting and shifting actions.

To solve this problem, U.S. patent application Ser. No. 541,671, filed on Oct. 13, 1983, assigned to the assignee of the present invention and Japanese Laid-Open Patent Application No. SHO 59-71102 have disclosed a recording and/or reproducing apparatus which is arranged as follows: With a recording medium such as a magnetic disc loaded on the apparatus, all the recording tracks on the medium are scanned by a head one after another. The scanning output of the head is detected and discriminating information thus obtained about recorded tracks and unrecorded or vacant tracks is stored in memory. Then, the head is shifted according to the stored information to a vacant track in recording and to a recorded track in the case of reproduction. The above-stated apparatus of the prior art is arranged, when a magnetic disc is loaded, to have all the tracks on the medium to be scanned from the first to the last of tracks one by one for the purpose of adequately controlling the head position for recording, and, upon completion of the scanning action on the last track, to bring the head to a vacant track. Therefore, in reproducing the records in the tracks of the recording medium, the head must be brought back to the initial reproducing position after completion of scanning all the tracks. Therefore, a great time lag takes place after loading the medium and before the commencement of reproduction. This has been a disadvantage in terms of operability of the apparatus.

SUMMARY OF THE INVENTION

It is a general object of this invention to solve the above-stated problems of the prior art.

It is a more specific object of this invention to provide a reproducing method or apparatus which permits prompt commencement of a reproducing operation.

It is another object of this invention to provide a reproducing apparatus which has improved operability.

Under this object, a reproducing apparatus arranged as a preferred embodiment of this invention comprises a head which scans the surface of a recording medium; first means for storing information about the presence or absence of any existing record in each of recording tracks by allowing the head to scan a group of recording tracks one by one on the medium; second means for causing the head to have access to its initial position at one end of the track group at the start of a reproducing operation; third means which is arranged to cause the head to have access, before actuating the first means, to the other end of the track column on the side opposite to the initial position and, upon completion of scanning by the head, to cause the head to have access to the initial position.

It is a further object of this invention to provide a recording and/or reproducing apparatus which is capable of making an adequate display in such a manner that a display of the number of unrecorded or vacant tracks will never be mistaken for a display of other kinds of information.

Under that object, a recording and/or reproducing apparatus arranged as another preferred embodiment of this invention to record and reproduce the addresses of recording parts of a recording medium by recording and/or reproducing means comprises: first detecting means for detecting the amount of unrecorded parts existing among the recording parts; second detecting means for detecting the address of a part to which the recording and reproducing means is having access; display means for displaying information on the addresses of the recording parts; and control means for causing the display means to make a display either in response to the first detecting means or the second detecting means.

It is a further object of this invention to provide a recording and/or reproducing apparatus which is capable of indicating the amount of a consecutively unrecorded parts of a recording medium in making a display of unrecorded or vacant parts of the recording medium.

It is a still further object of this invention to provide a recording apparatus of the kind continuously recording in a unrecorded part on a recording medium while renewing the recording position thereof, wherein there is provided an arrangement to enable the operator to know a remaining recordable amount even during the process of recording.

It is a still further object of this invention to provide a recording and/or reproducing apparatus which is capable of promptly carrying out a reproducing operation.

Under this object, a recording and/or reproducing apparatus having both recording and reproducing modes is arranged according to this invention to be capable of automatically presetting the reproducing mode in response to switching on of a power supply.

Further objects and features of this invention will become apparent from the following detailed description of embodiments thereof taken in connection with the accompanying drawings.

BRIEF DESCRIPTION OF THE DRAWINGS

FIGS. 2, 3 and 4 are flow charts showing the operation of a CPU 9 shown in FIG. 1.

FIG. 6 is a plan view showing the details of arrangement of a display device 16 shown in FIG. 5.

FIGS. 7, 8 and 9, 9A & 9B are flow charts showing the operation of a CPU 115 which is shown in FIG. 5.

DETAILED DESCRIPTION OF THE PREFERRED EMBODIMENTS

Figure 1:
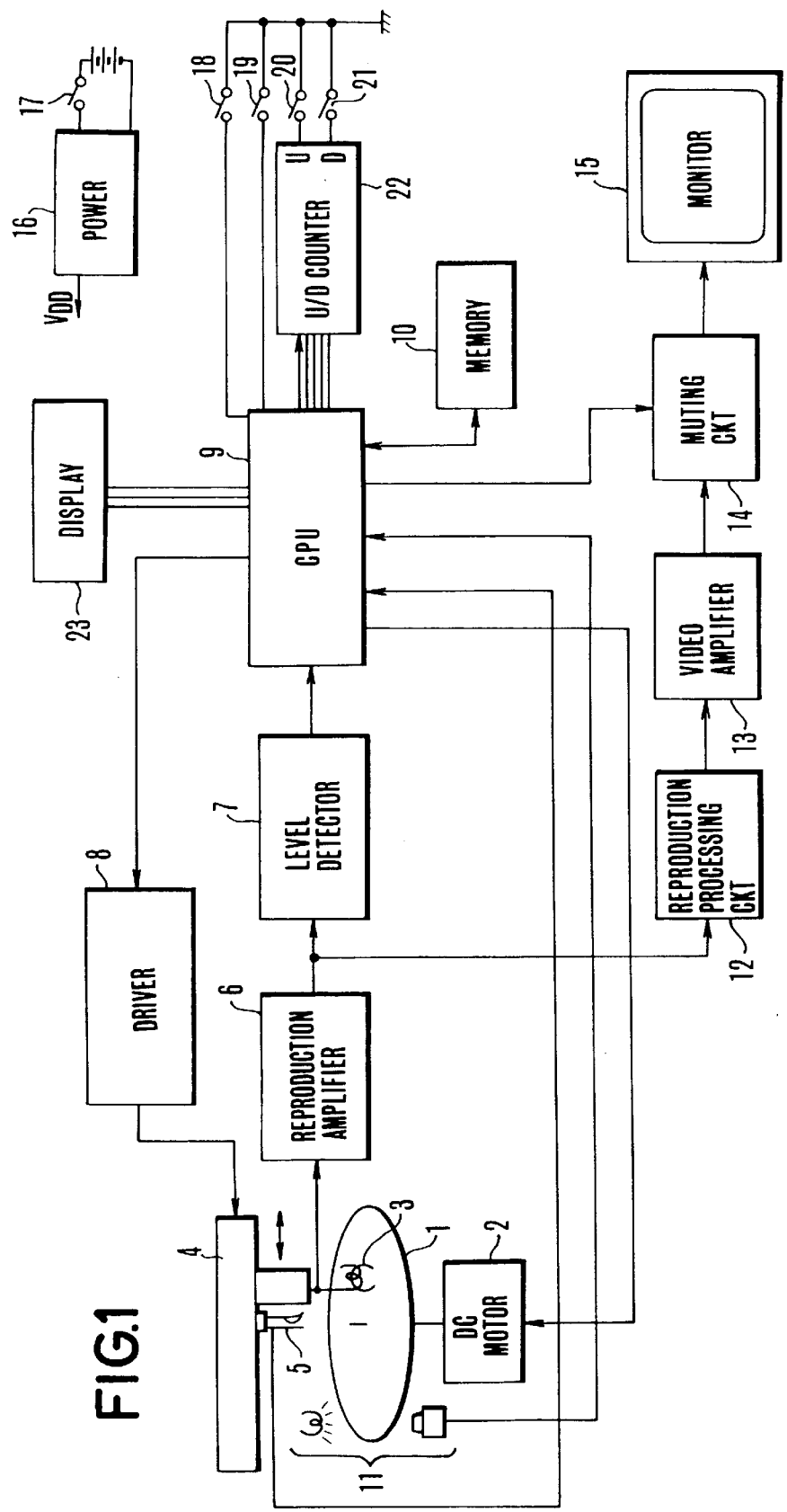
FIG. 1 is a block diagram showing the arrangement of an apparatus arranged as a first embodiment of this invention.

FIG. 1 shows in a block diagram the arrangement of a reproducing apparatus embodying this invention. A magnetic sheet 1 is arranged to have a number of recording/reproducing tracks, a track pitch and track position set beforehand. A DC motor 2 is arranged to cause the magnetic sheet to rotate at a constant speed. A reference numeral 3 denotes a magnetic head. A head shifting device 4 is arranged to shift the position of the magnetic head 3 to allow the head 3 to have access to any recording track formed on the magnetic sheet 1. A switch 5 is arranged to turn on when the magnetic head 3 is caused by the head shifting device 4 to have access to the innermost circular track. A reproduction amplifier 6 is arranged to amplify a signal detected by the magnetic head 3. A level detector 7 is arranged to detect the level of the output signal of the reproduction amplifier 6 and to produce a high level signal when the level thus detected is higher than a given level. A driver 8 is arranged to drive the head shifting device 4. A processing device (hereinafter referred to as CPU) 9 is arranged to receive signals produced from the innermost position detecting switch 5 and the level detector 7 and also the output signal of a switch 11 which is composed of a photo-coupler; to control the driver 8 which drives the head shifting device 4; and to control the rotation of the DC motor 2. A memory 10 is arranged to read out data from the CPU 9 and to write the read out data therein. A photo-coupler 11 is a switch which is arranged to detect that the magnetic sheet 1 is inserted and to operate with light blocked by insertion of the magnetic sheet 1. A reproduction processing circuit 12 is arranged to demodulate the output signal of the reproduction amplifier 6 and to perform a signal processing operation for reproduction of a video signal. A video amplifier 13 is arranged to amplify a reproduced video signal produced from the reproduction processing circuit 12. A muting circuit 14 is arranged to mute the output of the video amplifier 13 according to a signal coming from the CPU 9. A monitor 15 is arranged to monitor the output coming through the video amplifier 13 and the muting circuit 14. A power supply circuit 16 is arranged to generate a power supply voltage VDD. A reference numeral 17 denotes a power supply switch. A switch 18 is arranged to turn on from an OFF state when a magnetic sheet removal action is performed. A switch 19 is arranged to start a reproducing operation, which begins when this switch 19 is manually turned on. Switches 20 and 21 are arranged to decide which of the tracks are to be used in performing the reproducing operation. The counted value of an up-counter 22 increases by one every time the switch 20 is turned on. The counted value of a down-counter 22 decreases by one every time the switch 21 is turned on. The up-down counter 22 is arranged to supply the CPU 9 with a track number set by the switches 21 and 20. A display device 23 is arranged to display information about recording tracks, such as a number of tracks already used for recording.

In the case of this embodiment, the track group formed on the magnetic sheet 1 consists of a total of 50 tracks. A track formed in the outermost part of the magnetic sheet is called the first track and the track in the innermost part the 50th track. Further, hereinafter an action to shift the magnetic head toward the inner circumferential side will be called a track-up action and another action to shift the head toward the outer circumferential side a track-down action.

Figure 2:
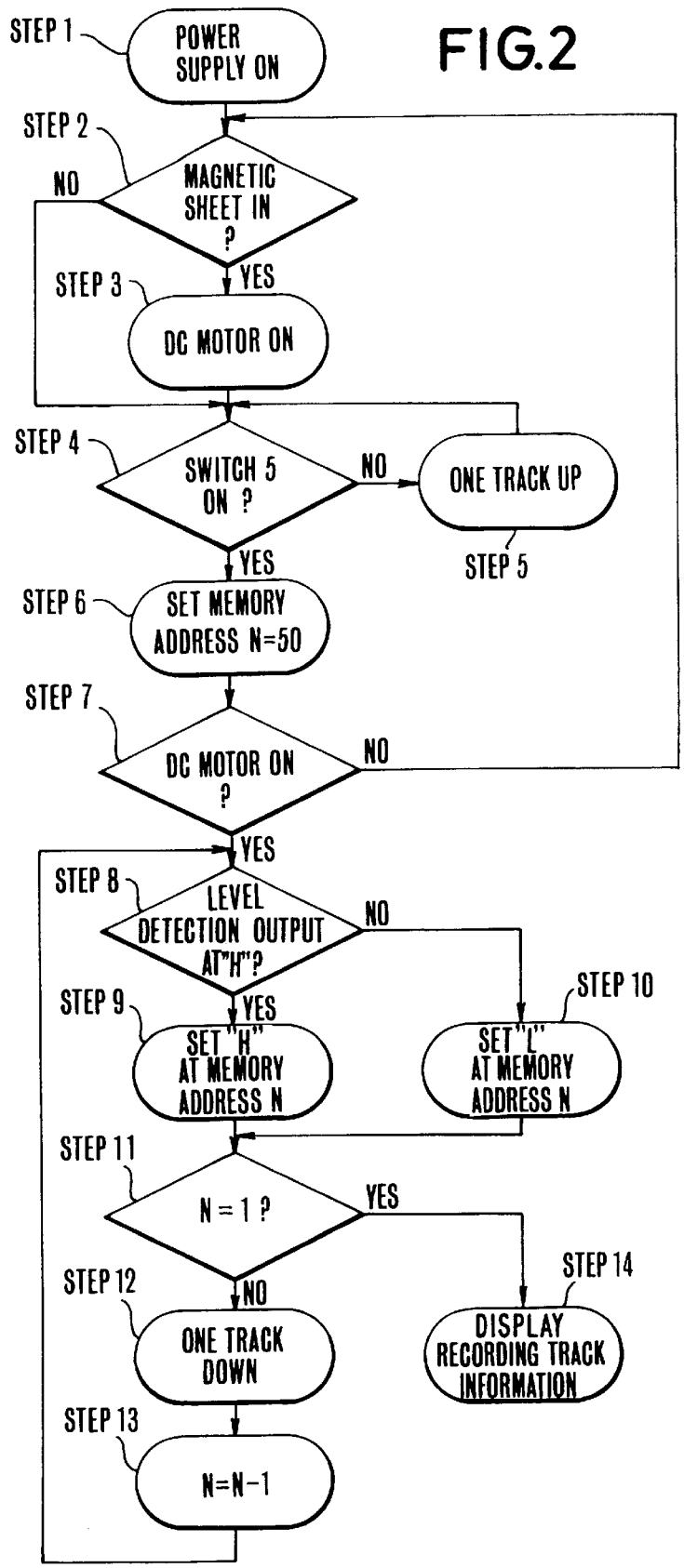

Referring to the flow chart shown in FIG. 2, the embodiment which is arranged as shown in FIG. 1 operates as follows: When the power supply switch 17 is turned on, the apparatus begins to operate as shown in the flow chart. With the power supply switch 17 turned on at a step 1, the CPU 9 makes a check at a step 2 to see whether the magnetic sheet 1 is inserted. If the magnetic sheet 1 is not inserted, the CPU 9, at a step 4, checks the switch 5 to see if it is ON. If not, that is, if the magnetic head 3 has not reached the innermost track position, the CPU 9 controls the driver 8 to have the head shifting device 4 actuated to shift the head 3 toward the inner circumferential side of the magnetic sheet to an extent corresponding to one track at a step 5. At the step 5, this action is repeated until the switch 5 turns on. The operation then comes to a step 6. At the step 6, the CPU 9 makes preparation for writing data into the memory 10 by setting the number of addresses N of the memory 10 at 50. At a step 7, the CPU 9 checks the DC motor 2 to see if it is rotating at a given speed. If not, the operation branches out to the step 2. In other words, if the magnetic sheet 1 is not inserted when the power supply is switched on, the flow of operation skips over a step 3 and comes to the step 4. Therefore, in that event, the DC motor 2 is not rotating at the given speed and the operation branches out from the step 7 to the step 2. As a result, the magnetic head 3 is in a state of waiting after having had access to 50 tracks. In case that the power supply switch 17 is turned on with the magnetic sheet 1 having been inserted in position, the operation is performed as follows: In this instance, when the power supply switch 17 is turned on, the flow of operation proceeds from the step 2 to the step 3. At Step 3, the CPU 9 causes the DC motor 2 to rotate at the given speed. Then, the ON state of the switch 5 is detected at steps 4 and 5. In other words, the head 3 is shifted until the switch 5 is turned on by the head 3. After that, with the motor detected to be rotating at the given speed at the step 7, the flow of operation proceeds to a step 8. Further, the operation is performed in the same manner in case that the magnetic sheet 1 is inserted with the head 3 having had access to 50 tracks after the power supply was turned on. Signals recorded in the 50 tracks on the magnetic sheet 1 are reproduced by the magnetic head 3 and are supplied to the reproduction amplifier 6 to be amplifier there. The amplified signal is supplied to the level detector 7. The level detector 7 then checks the level of the reproduced signal to find if it is higher than a predetermined level. If so, the level detector 7 produces a high level signal to the CPU 9. If not, a low level signal is supplied to the CPU 9. When the DC motor 2 is found rotating at the step 7, the CPU 9 read the signal of the level detector 7 at a step 8. At steps 9 and 10, when the signal thus read out is at a high level, the high level is stored as data at the address N (N=50) of the memory 10; and if the signal is at a low level, the low level is stored as data. At a step 11, a check is made to see if the memory address N is equal to "1". If not, the CPU 9 drives the driver 8 to actuate the head shifting device 4 at a step 12. At the step 12, then, the head shifting device 4 shifts the magnetic head toward the outer circumferential side of the medium to an extent corresponding to one track. Since the magnetic head 3 is at the 50th track and is not equal to 1, the operation proceeds to a step 11. Next, data N−1 is stored as the memory address N and the operation branches out to the step 8. Then the above-stated loop of steps is repeated. Since the magnetic head 3 is at the 50th track, this loop of steps is repeated 50 times before the value N becomes equal to 1. With the value N thus having become equal to 1, the operation shifts to a step 14 to complete an initial setting action. Information on the recording track is then displayed. The details of the reproducing operation which follows the step 14 of FIG. 2 is as described below with reference to FIG. 3:

FIG. 3 is a flow chart showing the operation of the CPU 9 to be performed for reproduction. With the head 3 having come to the initial position for reproduction at the step 14, the CPU 9 makes a discrimination at a step 15 as to whether an instruction has been made for commencement of a reproducing operation. If so, the operation proceeds to a step 16. The discrimination as to whether the instruction is given for commencement of the reproducing operation is made by checking whether the input port of the CPU 9 connected to the switch 19 is at a high level or at a low level. At the step 16, a specific track number set by means of the switches 20 and 21 is read out from the up-down counter 22. Then, data of the memory 10 corresponding to this number is thus read out. At a step 17, a check is made to find whether the track of this number has been already recorded or not. If it is found recorded, the operation comes to a step 18 and, if not recorded, it comes to a step 19.

At the step 18, the head 3 is shifted to the track of the track number set by the switches 20 and 21. The signal from the head 3 is then supplied via the reproduction processing circuit 12 and the video amplifier 13 to the muting circuit 14. Here, since no instruction has been given by the CPU 9 to the muting circuit 14 for commencement of a muting action, the output of the video amplifier 13 is supplied to the monitor 15. The signal from the head 3 is thus reproduced on the monitor 15. At the step 19, since in this instance the muting circuit 14 is instructed by the CPU 9 to perform a muting action, a display of white noise can be prevented from being made at the monitor 15.

In the event of cancellation of the reproducing mode by, for example, change-over to the recording mode, the operation comes from a step 20 to an end.

With the initial setting process thus having been completed, the magnetic head 3 comes to scan all the tracks one after another beginning with the 50th track to store information about the presence or absence of any existing record in each of the tracks. After that, the magnetic head 3 is in a position having access to the first track, i.e. the initial position for reproduction. Therefore, compared with the conventional method in which the magnetic head 3 is caused to scan all the tracks one after another beginning with the first track and ending at the 50th track and then to allow the head 3 to have access to the initial reproducing position, the arrangement of the embodiment shortens a length of time required in preparing for a reproducing operation.

Referring now to FIG. 4, when the magnetic sheet is taken out during the process of reproduction or while the flow of operation of the steps 7 to 14 shown in FIG. 2 or during the flow of operation shown in FIG. 3, the embodiment operates as follows: With the magnetic sheet taken out at such timing, the information about the presence or absence of records in all the tracks which is stored at the memory 10 is no longer reliably applicable to the tracks of another magnetic sheet to be loaded next time. It is, therefore, necessary to detect once again the presence and absence of existing records in all the tracks of the newly loaded magnetic sheet. In view of this, in another embodiment of this invention, which will be described in the following, the magnetic head 3 is arranged to be shifted to the end part opposite to the initial reproducing position again for the purpose of detecting the presence or absence of existing previous records in all the tracks when the magnetic sheet is taken out as mentioned above, so that preparation time for a next reproducing operation can be shortened as much as possible. The flow of operation shown in FIG. 4 is performed in a time sharing manner in relation to the flows of operation shown in FIGS. 2 and 3. The steps of the flow of operation of FIG. 4 are carried out in an interrupting mode of the CPU 9. At a step 21, a check is made to find whether the switch 18 of FIG. 1 has turned on indicating that a magnetic sheet taking-out action has been performed. If the switch is thus found to be in an ON state at the step 21, the operation proceeds to a next step 22. At the step 22, a magnetic sheet ejecting device is caused to perform its action of taking the magnetic sheet out. At a step 23, the driving action of the DC motor 2 is brought to a stop and then the operation branches out to the step 4 of FIG. 2. The steps 4 and 5 are repeated to bring the magnetic head to the 50th track as mentioned in the foregoing. The operation then comes to the step 7. Meanwhile, since the driving action of the DC motor 2 has been brought to a stop at the step 23, the flow of operation branches from the step 7 over to the step 2 to repeat the loop of steps from the step 7 to the step 2. Then, when insertion of the magnetic sheet is detected by the photo-coupler 11, the flow of operation is performed in the same manner as described in the foregoing.

In the embodiment described, the initial reproducing position of the head is arranged to be the first track. However, this arrangement may be changed to have the initial position of the head set at a 52nd track which is a cue track having control signals indicative of the reproducing sequence, a reproducing method, etc. for the image information recorded in the tracks from the first track to the 50th track. In that event, the switch 5 of FIG. 1 is replaced with a switch which is arranged to shift its connecting position when the head comes to have access to the first track. The step 5 of FIG. 2 is changed from the one-track-up action to a one-track-down action. Then, at steps 6 and 12, the first address of the memory is set at N=1. At the step 11, a check is made to see if the address number is N=50. At the step 13, the address number is set as N=N+1.

Further, in the embodiment described, a magnetic sheet is employed as the recording medium. However, other recording media are also usable, such as an optical disc, a photo-magnetic disc or the like. In that event, an optical head may be employed. Further, a card-shaped recording medium is also usable in accordance with this invention.

As described in the foregoing, in accordance with the arrangement of this embodiment, the head scans the tracks of the recording medium one by one in storing information about the presence or absence of existing record in each of the tracks. For this storing process, the head is brought to one end part of the medium which is opposite to the other end having the initial reproducing position of the head. This arrangement effectively shortens a time lag before commencement of the reproducing operation, so that the operability of the apparatus can be improved.

Further, in the case of the recording and reproducing apparatus disclosed in the patent application referred to in the prior art description given herein, the number of unrecorded tracks is detected by scanning the surface of the recording medium to find the absence or presence of existing records in the tracks and the number of unrecorded tracks is displayed. In addition to that, a track number of a track being presently scanned is also displayed. However, in the recording and reproducing apparatus of the prior art, a display device for displaying the number of unrecorded tracks is discretely arranged in addition to another display device which is provided for displaying the track number of a track presently under the scanning process being performed by the head. This arrangement not only necessitate use of two display devices but also is misleading and troublesome for the operator because of the simultaneous display of the number of unrecorded track which is most important in recording and the track number being scanned which is most important during reproduction. The prior art display arrangement thus has been confusing.

Figure 5:
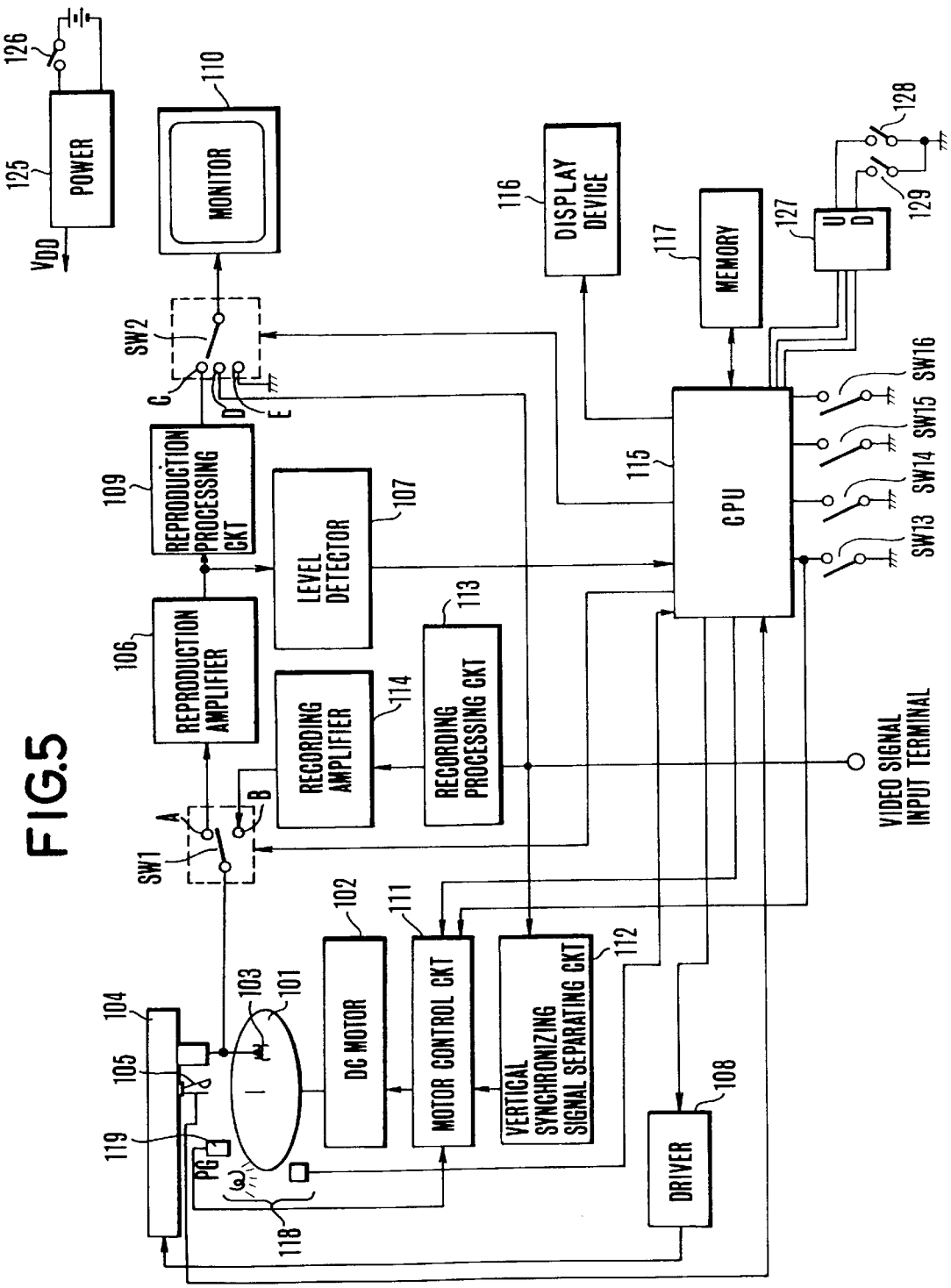
FIG. 5 is a block diagram showing the arrangement of an apparatus arranged as a second embodiment of this invention.

Therefore, a second embodiment of this invention is arranged to solve this problem. FIG. 5 shows that embodiment. The second embodiment is a recording and reproducing apparatus which is arranged to record and reproduce a still image signal on and from a magnetic sheet by means of a magnetic head. However, in accordance with this invention, the recording medium is not limited to a magnetic sheet but such medium as a semiconductor memory or a solid-state memory is also usable.

In FIG. 5, component elements 101 to 108 included in the block diagram are arranged to perform the same functions as those of the elements 1 to 8 shown in FIG. 1. Therefore, the details of them are omitted from the following description: The illustration includes a monitor 110; and a motor control circuit 111 which is arranged to control a DC motor 102. The circuit 111 receives a signal produced from a vertical synchronizing signal separating circuit 112 (hereinafter referred to as the V-separating circuit) and information on the state of a PG signal switch 119. In recording, the control circuit 111 controls and causes the DC motor 102 to rotate at a given speed and controls the disc rotation phase signal 119 (hereinafter referred to as PG signal) to be in a given phase relation to the timing of a vertical synchronizing signal separated by the V-separating circuit 112. During reproduction, the control circuit 111 controls and causes the DC motor 102 to rotate in such a way as to have the PG signal 119 is in a given phase relation to a reference signal produced from a reference signal oscillator disposed within the motor control circuit 111. The V-separating circuit 112 is arranged to separate the vertical synchronizing signal from a video signal coming via a video signal input terminal. A recording processing circuit 113 is arranged to modulate the incoming video signal and converts it into a signal form suited for recording on the magnetic sheet. A recording amplifier 114 is arranged to receive a signal produced from a magnetic head 103 according as the connecting position of a switch SW1 shifts from one position to the other. A microcomputer 115 (hereinafter referred to as CPU) is arranged as follows:

The CPU 115 receives the output signals of switches SW13, SW14, SW15 and SW16 and a level detector 107. It also receives signals from a photo-coupler 118 and an innermost peripheral part detecting switch 105. The CPU 115 is arranged to control a driver 108 which is arranged to drive a head shifting device 104; to control the motor control circuit 111; to produce signals for shifting the connecting positions of switches SW1 and SW2; to control a display device 116; to write and read a memory 117; and to control the whole system of the apparatus. The display device 116 is composed of LEDs 120, 121 and 122 which are arranged to show different modes and seven-segment LEDs 123 and 124 which are arranged to show desired figures as shown in FIG. 6 under the control of the CPU 115. A readable and writable memory 117 is arranged to permit reading and writing by the CPU 115. The memory 117 has a one-bit storing area for every track on the magnetic sheet 101. A bistable type switch SW13 is arranged to be manually operated for selection of a recording mode or a reproducing mode. The recording mode is selected when this switch SW13 is turned on and the reproducing mode is selected when it is turned off. The whole apparatus is thus arranged to operate under the control of the CPU 115. A monostable type switch SW14 is arranged to be manually operated. When the switch SW14 is turned on into an unstable state, a video signal is recorded in the track being scanned by the head 103. After recording in this track, the head is automatically shifted inward to an extent corresponding to one track. A bistable switch SW15 is arranged also to be manually operated. When the switch SW15 is operated into an ON state which is a stable state, the apparatus is set into a continuous recording mode in which the head is continuously shifted. When the switch SW15 is in an OFF state, the apparatus is set into a single recording mode in which recording is made in one track only. Another manual operating switch SW16 is arranged to eject the magnetic sheet out of the loaded position when the switch is turned on. A photo-coupler 118 is arranged to detect the presence or absence of the magnetic sheet 101. The photo-coupler 118 supplies a high level signal to the CPU 115 when light is blocked by the magnetic sheet 101 inserted and supplies the CPU with a low level signal when the sheet 101 is not inserted and the light reaches thereto.

A power supply circuit 125 is arranged to generate a power supply voltage VDD and is provided with a power supply switch 126. An up-down counter 127 is arranged to permit the counted value thereof to be controllable by means of an up-switch 128 and a down-switch 129.

The magnetic sheet 101 is arranged to have a total of 50 recording tracks formed thereon in the same manner as in the case of the preceding embodiment shown in FIG. 1. A first track is formed in the outermost part of the magnetic sheet and a 50th track in the innermost part thereof. In the following description, a magnetic head shifting action toward the inner side of the sheet is called a track-up action and a head shifting action toward the outer side a track-down action.

The following description shows the details of operation of this embodiment with reference to the accompanying drawings: First, the operation to be performed when the power supply is switched on is described with reference to FIGS. 5 and 7. The apparatus operates according to the flow of operation as shown in FIG. 7. Referring to FIG. 7, with the power supply switch 126 turned on, the CPU 115 shifts the connecting position of the switch SW1 to one terminal A thereof to set thereby the apparatus into the reproducing mode (a step 2). Since this apparatus is arranged to mainly perform a reproducing function, it assumes the reproducing mode when the power supply is turned on. This arrangement enhances the operability. The ensuing flow of operation is identical with the operation described in the foregoing with reference to FIG. 2 and is therefore omitted from the following description.

After completion of the flow of operation shown in FIG. 7, a further flow of operation is performed as described below with reference to FIG. 8:

With the operation arriving at the step 14 of FIG. 7, the head 103 is allowed to have access to the initial reproducing position. Then, at a step 15 of FIG. 8, a check is made to see if the switch SW13 is in an OFF state indicating thereby the selection of the reproducing mode. If so, the operation proceeds to a step 16. If not, the apparatus is assumed to be in the recording mode and the operation proceeds to the step 25 of FIG. 9. At a step 16-1 of FIG. 8, the connecting position of the switch SW1 of FIG. 5 is shifted to one side A thereof and that of another switch SW2 to one side C thereof. This causes the "PB" LED 122 to light up. Following this, at a step 16-2, a track number set by the switches 128 and 129 is read out from the up-down counter 127 and is displayed. Then, data corresponding to this track number is read out from the memory 117. At a step 17 and steps subsequent thereto, a flow of operation is carried out in the same manner as described in the foregoing with reference to FIG. 3.

In the embodiment shown in FIG. 5, a muting action to be performed at a step 19 is arranged to be performed with the connecting position of the switch SW2 shifted to its terminal E by the CPU 115.

Figure 9B:
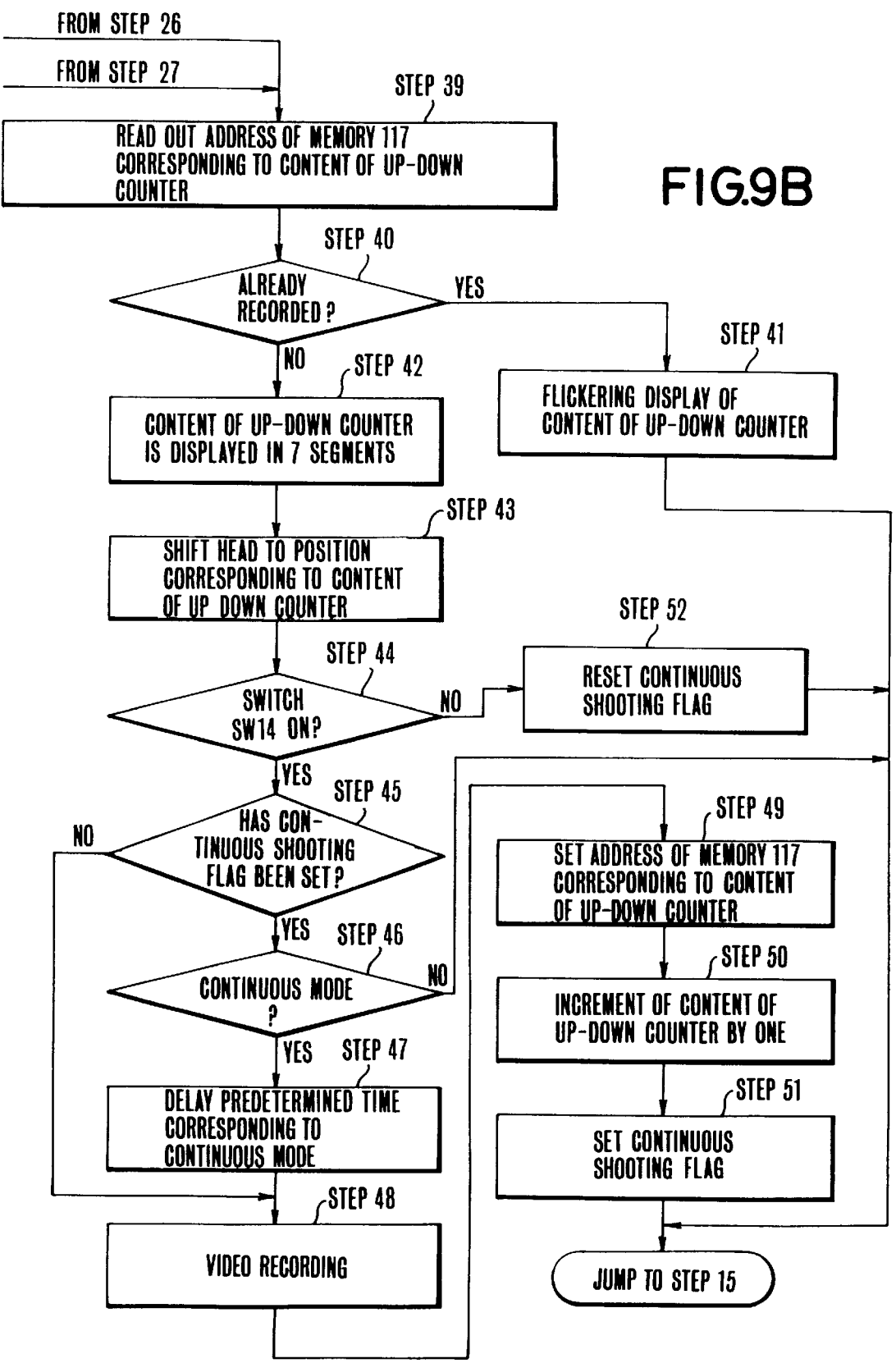

Referring to FIG. 9, the operation of the embodiment in the recording mode is as follows: With the switch SW13 in the ON state thereof indicating selection of the recording mode, the flow of operation branches out from the step 15 of FIG. 8 to the step 25 of FIG. 9. At the step 25, the "REC" LED 120 is caused to light up. Further, the connecting position of the switch SW2 is shifted to the terminal D thereof. By this, the monitor 110 is connected to the video signal input terminal.

Following that at a step 26, a check is made to see if the apparatus is in the continuous recording mode. If the switch SW15 is in an ON state, the continuous recording mode is selected. If so, therefore, the flow of operation proceeds to a step 27. If the switch SW15 is in an OFF state, the single recording mode is selected. In that event, the flow of operation comes to a step 39. Let us now assume that the operation comes to the step 39 with the single recording mode having been selected.

At the step 39, an address of the memory 117 which corresponds to the content of the up-down counter 127 is read out. Then, at a step 40, a check is made to see if the applicable track has an existing record therein. If so, the seven-segment display elements 123 and 124 shown in FIG. 6 is caused to make a flickering display showing the content of the up-down counter 127 at a step 41. The flow of operation then jumps to the step 15 of FIG. 8. Then, a loop of operation consisting of the steps 15, 25, 26, 39, 40 and 41 is repeated until the content of the up-down counter is renewed. In case that the track of the address set by the up-down counter 127 has no existing record therein, the flow of operation proceeds to a step 42. At the step 42, the seven-segment display elements 123 and 124 are caused to display the content of the up-down counter 127 by lighting up without flickering. Following this, at a step 43, the head 103 is allowed to have access to a track designated by the up-down counter 127. If, at this step, the switch SW14 is turned on, the flow of operation proceeds to a step 48 and a video recording is performed.

A continuous shooting flag which is shown at a step 45 is arranged to be set in the case of continuous recording. This flag is not set for the first round of recording and the flow of operation comes to the step 48 as mentioned in the foregoing. Then, at a step 49, an address corresponding to the content of the up-down counter 127 is set at the memory 117. In other words, an address corresponding to a track in which a video signal has been recorded is set at the memory 117. Then, the continuous shooting flag is set at a step 51 by increasing the counted value of the up-down counter by one. The flow of operation then jumps to the step 15.

Then, the above-stated flow of operation is repeated from the step 15. However, the continuous shooting flag is continuously set as long as the switch SW14 remains in its ON state. Therefore, the flow of operation jumps to the step 15 after the steps 44, 45 and 46. As a result, the recording is performed only once. After that, when the switch 14 is turned off with recording having become no longer necessary, the flow of operation comes to a step 52. At the step 52, the continuous shooting flag is reset. The operation then jumps again to the step 15 to repeat the loop of operation described above. During this repeated flow of operation, if the switch SW14 is turned on, the video signal recording is again performed. Further, at the step 50, if the track which corresponds to the increased value of the content of the up-down counter 127 already has an existing record, the flow of operation proceeds from the step 40 to the step 41. At the step 41, the seven-segment elements 123 and 124 flicker and the switch SW14 is turned on to have video recording no longer performed.

In this instance, if another track is designated with the content of the up-down counter 127 changed by operating the switches 128 and 129 shown in FIG. 5 until a vacant track is found, video recording can be further performed by operating the switch SW14.

Next, when the continuous recording mode is selected by turning the switch SW15 on, the embodiment operates as follows: In that instance, the flow of operation proceeds from the step 26 to a step 27. The continuous shooting flag is not set as yet immediately after the selection of the continuous recording mode and no video recording is performed. The flow of operation then proceeds from the step 27 to a step 28. At the step 28, the LED 121 which indicates the continuous recording mode comes to light up in addition to the LED 120 which is arranged to indicate a recording state. At a step 29, the track number of a track to which the head has access is set at N. At steps 32, 33 and 34, a number of tracks which follow and consecutively have no existing or previous record therein are counted as "m". A result of count thus obtained is then displayed, at a step 36, by the seven-segment elements 123 and 124 shown in FIG. 6. If the result of count m is 0, the flow of operation comes from the step 35 to a step 37. At the step 37, the content of the up-down counter 127 is displayed in a flickering manner by the seven-segment elements 123 and 124. The flow of operation then comes back to the step 15. Then, if a vacant track is reached by operating the switches 128 and 129 to change the counted value of the up-down counter 127, a number of consecutively vacant tracks ensuing the newly reached track is detected and displayed at the step 36. Following that, the flow of operation again begins from the step 15.

In this embodiment, in case that the result of count m is zero at the step 35, the content of the up-down counter 127 is arranged to be displayed in a flickering manner. However, this arrangement may be changed to make a flickering display of some different information, such as "00" instead of the content of the up-down counter.

At the step 36, if the switch SW14 is not turned on while the number m of the consecutively vacant track is on display, the flow of operation shifts from the steps 43 and 44 to the step 52 and then the loop of operation is again repeated beginning with the step 15.

Further, while the content of the up-down counter 127 is on the flickering display at the step 37 with no vacant track found, if a vacant track is found by changing the content of the up-down counter 127, the value m does not become 0 at the step 35. Therefore, a number of vacant tracks comes to be displayed at the step 36. In that case, the flow of operation jumps to the step 43. At the step 43, the head is shifted to a track corresponding to the track number set at the up-down counter 127. Then, if the switch SW14 is not in an ON state, the flow of operation comes from the steps 43 and 44 to the step 15 via the step 52 and this loop of operation is repeated.

Since the loop of operation from the step 15 is repeated in exactly the same manner as described in the foregoing, if the switches 128 and 129 are operated during this repeating process, a number of consecutively vacant tracks is displayed according to the switch operation. Under this condition, the operator can decide a desired number of performances of continuous shooting. Then, with the switch SW14 turned on for video recording, the flow of operation proceeds from the step 44 to the step 45. Since the continuous shooting flag is not set at this point of time, the flow of operation jumps to the step 48. Then, the connecting position of the switch SW1 is immediately shifted to the side B thereof to allow video recording at the step 48. At a step 49, an address corresponding to the track in which video recording is effected is set at the memory 117. Then, to enable the head 103 to have access to a next track, the content of the up-down counter 127 is increased by one at a step 50. At a step 51, the continuous shooting flag is set. When the flow of operation progresses from the step 15 with the continuous shooting flag thus set, the flow branches at the step 27 to a step 39. At the step 42, the seven-segment elements 123 and 124 are caused to display the renewed content of the up-down counter 127, i.e. the content which is increased by one at the step 50. At the step 43, the head 103 is shifted to a track which is thus designated by the up-down counter 127 and is located further inward by one track pitch from the first recorded track. If the switch SW14 still remains in its ON state under this condition, the flow comes to a step 45. However, since the continuous shooting flag is set at the above-stated step 51, the flow comes to a step 47 via a step 46.

The step 47 is provided for the purpose of applying a preset interval time in the continuous recording mode. In the case where continuous shooting is to be made for two frames per sec., for example, a delay time of 0.5 sec. is given at the step 47. After the lapse of the interval time, video recording is performed and the same loop of operation as the loop mentioned in the foregoing is repeated. Further, when the head 103 comes to the last of the consecutive unrecorded or vacant tracks while the switch SW14 is continuously in the ON state, the flow of operation branches from the step 40 to the step 41. Then the seven-segment elements 123 and 124 come to display the track number of a recorded track located on the inner side next to the last unrecorded track.

In case that the video recording is performed up to the 50th track while the switch SW14 is continuously in the ON state, the counted value of the up-down counter cannot be incremented any longer at the step 50. The 50 addresses of the memory 117 obtained at the step 49 therefore remains unchanged at the step 50. In the ensuing loop of operation, therefore, the flow of operation branches from the step 40 to the step 41 and a flickering display "50" is made at the seven-segment elements 123 and 124 to inform thereby the operator that there remains no track.

During the video recording process, if the switch SW14 is turned off from the ON state, the flow of operation branches from the step 44 to the step 52. Then the flow is restarted from the step 15. At the step 27, it does not branch out to the step 39 but proceeds to the step 28. Therefore, a number of consecutively vacant tracks located on the inner side of the track to which the head is having access is displayed in the same manner as mentioned in the foregoing. If the switch SW14 is again turned on at that point of time, the flow of operation proceeds in exactly the same sequence of steps as the sequence mentioned in the foregoing. Then, as long as the switch SW14 remains on, recording is continuously performed at intervals of time set at the step 47. It goes without saying that the recording action is suspended during the process of the above-stated flow of operation if the continuous recording mode or the recording mode is cancelled.

In the embodiment described, when the continous shooting flag is set at the step 51 after a first round of recording is performed with the continuous recording mode selected and the switch SW14 turned on, the flow of operation branches from the step 27 out to the step 39. In that instance, therefore, the display device 116 displays the content of the up-down counter 127, i.e. the track number of a track to which the head 103 is having access. However, if the step 27 is omitted, the number m of consecutively recordable tracks in the continuous recording mode is displayed and the display value is decremented by one at the end of every round of recording. This enables the operator to know the remaining amount of recordable space during a continuous recording operation. This is an advantageous feature of the embodiment in terms of operability.

Further, in this embodiment, the number of consecutive vacant tracks is arranged to be displayed by the seven-segment display elements 123 and 124 shown in FIG. 6 if the continuous recording mode is selected. However, this arrangement may be changed to display the number of all the vacant tracks available on the magnetic sheet 1 instead of just the consecutively vacant tracks. In that case, the flow of operation shown in FIG. 9 is branched from the step 31 to the step 33 and further from the step 33 to the step 35. Then, in that instance, if the flow of operation does not proceed from the step 35 to the step 36 but comes to the step 37 to cause the seven-segment elements 123 and 124 to make the flickering display of "50", the display informs the operator of the end of available vacant tracks.

The display device shown in FIG. 6 may be replaced with some other display arrangements. Other possible display arrangements include a method of making a display superimposed on a video signal on the monitor 110.

In accordance with the arrangement of the embodiment described, the number of consecutively vacant tracks or the number of all vacant tracks available on the magnetic sheet is arranged to be displayed in the event of selection of the continuous recording mode; in the case of the single recording mode or the reproduction mode, the position of a track presently under the scanning operation of the head is displayed; and these different modes of display are arranged to be automatically changeable from one mode over to the other. The arrangement results in excellent operability of the apparatus.

This embodiment employs a magnetic sheet as a recording medium. However, the medium may be an optical disc or some other recording medium that is not in a sheet-like shape, such as a semi-conductor memory, a bubble memory or some other solid-state memory.

In the case of a solid-state memory, the above-stated vacant or unrecorded tracks corresponds to vacant address. In that instance, the recording and reproducing means described in the foregoing is replaced with some reading means which is arranged to read signals from the semiconductor memory or the bubble memory.

As mentioned above, in accordance with the arrangement of this embodiment, the display of the number of vacant tracks or that of the track number of a track being scanned by the head is selectively made to prevent the operator from mistaking the display, so that the operability of the apparatus can be greatly enhanced.

What is claimed is:

1. A recording and/or reproducing apparatus for recording or reproducing image information in or from each of recording blocks provided on a recording medium, comprising:
   a) switching means for switching a recording mode between a single recording mode and a continuous recording mode;
   b) first detecting means for detecting the number of pictures continuously recordable, the number of unrecorded blocks not corresponding to the number of pictures continuously recordable on the recording medium;
   c) first display means for displaying information on the number of pictures continuously recordable on to the recording medium which has been detected by said first detecting means;
   d) control means which is arranged to cause said first display means to display the amount of pictures continuously recordable on the recording medium when the switching mode is switched to said continuous recording mode by said switching means; and
   e) second display means for displaying that the recording mode is the continuous recording mode when the recording mode is switched to the continuous recording mode by said switching means.

2. An apparatus according to claim 1, further comprising:
   d) a head arranged to record or reproduce information in or from each of said blocks.

3. An apparatus according to claim 2, further comprising:
   e) second detecting means for detecting the address of a recording block to which said head is having access.

4. An apparatus according to claim 1, wherein said recording medium is in a disc-like shape.

5. An apparatus according to claim 4, wherein said recording blocks are recording tracks concentrically formed on said disc-shaped recording medium.

6. An apparatus according to claim 1, wherein said first detecting means includes:
   a) detecting means for detecting the presence or absence of any existing recording in each of said blocks; and
   b) counting means for counting the number of blocks which are found to have no existing record therein.

7. A recording apparatus for recording image information in recording blocks provided on a recording medium, comprising:
   switching means for switching a recording mode between a single recording mode and a continuous recording mode;
   detecting means for detecting a number of pictures continuously recordable on said recording medium, the number of unrecording blocks not corresponding to the pictures continuously recordable on the recording medium; and
   means for displaying the number of pictures continuously recordable when said switching means is switched to said continuous recording mode.

8. A recording apparatus according to claim 7, wherein said display means includes seven-segment display element.

9. A recording apparatus according to claim 7, wherein said recording medium is a disc-shaped recording medium.

10. A recording apparatus according to claim 9, wherein said recording blocks are recording tracks concentrically formed on said recording medium.

* * * * *

UNITED STATES PATENT AND TRADEMARK OFFICE
CERTIFICATE OF CORRECTION

PATENT NO. : 6,061,090
DATED : May 9, 2000
INVENTOR(S) : Shigeo Yamagata

It is certified that error appears in the above-identified patent and that said Letters Patent are hereby corrected as shown below:

On the title page, item [63], line 1, delete "May 19, 1994" and insert -- May 9, 1994 --.
On the title page, item [63], line 5, delete "October 19, 1990" and insert -- October 16, 1990 --.
    Col. 1, line 9, delete "October 19, 1990" and insert -- October 16, 1990 --.

Signed and Sealed this

Twenty-second Day of May, 2001

Attest:

NICHOLAS P. GODICI

*Attesting Officer*    *Acting Director of the United States Patent and Trademark Office*